United States Patent
Mitra et al.

(10) Patent No.: US 10,201,802 B2
(45) Date of Patent: Feb. 12, 2019

(54) METHOD OF MAKING HETERO-ATOM DOPED ACTIVATED CARBON

(71) Applicant: Farad Power, Inc., Hillsborough, CA (US)

(72) Inventors: Shantanu Mitra, Hillsborough, CA (US); Vinod Nair, Coraopolis, PA (US)

(73) Assignee: Farad Power, Inc., Sunnyvale, CA (US)

( * ) Notice: Subject to any disclaimer, the term of this patent is extended or adjusted under 35 U.S.C. 154(b) by 0 days.

(21) Appl. No.: 15/706,744

(22) Filed: Sep. 17, 2017

(65) Prior Publication Data

US 2018/0015440 A1    Jan. 18, 2018

Related U.S. Application Data

(63) Continuation-in-part of application No. 15/255,128, filed on Sep. 1, 2016, now Pat. No. 9,975,778, and a
(Continued)

(51) Int. Cl.
   *B01J 20/20*    (2006.01)
   *B01J 20/28*    (2006.01)
   (Continued)

(52) U.S. Cl.
   CPC ......... *B01J 20/20* (2013.01); *B01J 20/28066* (2013.01); *B01J 20/3078* (2013.01);
   (Continued)

(58) Field of Classification Search
   CPC .. B01J 20/20; B01J 20/28066; B01J 20/3085; B01J 20/3078; B01J 2220/4825;
   (Continued)

(56) References Cited

U.S. PATENT DOCUMENTS 3,168,494 A    2/1965    Metil
7,919,014 B2   4/2011    Kazaryan et al.
(Continued)

OTHER PUBLICATIONS

Liu, Zhen, et al. "Furfuralcohol Co-Polymerized Urea Formaldehyde Resin-derived N-Doped Microporous Carbon for CO 2 Capture." Nanoscale research letters 10.1 (2015): 333.*
(Continued)

*Primary Examiner* — Richard M Rump
(74) *Attorney, Agent, or Firm* — Geeta Kadambi; Riddhi IP LLC

(57) ABSTRACT

A method of making heteroatom-doped activated carbon is described in this application. Specifically, it describes a process that utilizes liquid furfuryl-functional-group compounds as starting materials, which are then used to dissolve the heteroatom containing source compounds, before being polymerized into solids using catalysts. The polymerized solids are then carbonized and activated to make the heteroatom-doped activated carbon. Electric double-layer capacitors (EDLC) were fabricated with activated carbons doped with boron and nitrogen, and tested for performance. Also, the boron and nitrogen content in the activated carbons was confirmed by chemical analysis.

17 Claims, 3 Drawing Sheets

Related U.S. Application Data continuation-in-part of application No. 15/208,336, filed on Jul. 12, 2016, now Pat. No. 9,916,938, and a continuation-in-part of application No. 15/242,113, filed on Aug. 19, 2016, now Pat. No. 9,938,152.

(60) Provisional application No. 62/396,171, filed on Sep. 18, 2016.

(51) Int. Cl.

| | | |
|---|---|---|
| *B01J 20/30* | (2006.01) | |
| *C01B 32/33* | (2017.01) | |
| *C01B 32/336* | (2017.01) | |
| *H01G 11/34* | (2013.01) | |
| *H01G 11/36* | (2013.01) | |
| *H01G 11/86* | (2013.01) | |
| *C01B 32/30* | (2017.01) | |
| *C01B 32/366* | (2017.01) | |
| *C01B 32/348* | (2017.01) | |

(52) U.S. Cl.
CPC .......... *B01J 20/3085* (2013.01); *C01B 32/30* (2017.08); *C01B 32/33* (2017.08); *C01B 32/336* (2017.08); *C01B 32/348* (2017.08); *C01B 32/366* (2017.08); *H01G 11/34* (2013.01); *H01G 11/36* (2013.01); *H01G 11/86* (2013.01); *B01J 2220/4825* (2013.01); *C01P 2006/12* (2013.01); *Y02E 60/13* (2013.01)

(58) Field of Classification Search
CPC ....... C01B 32/336; C01B 32/33; H01G 11/86; H01G 11/36; H01G 11/34; C01P 2006/12
See application file for complete search history.

(56) References Cited

U.S. PATENT DOCUMENTS

2013/0316178 A1\* 11/2013 Matsumoto ............ C08G 65/36
428/402
2015/0132211 A1\* 5/2015 Mitra ...................... C01B 31/10
423/445 R

OTHER PUBLICATIONS

Ozaki, Jun-ichi, et al. "Preparation and oxygen reduction activity of BN-doped carbons." Carbon 45.9 (2007): 1847-1853.*
Brunauer, Stephen, Adsorption of Gases in Multimolecular Layers, Journal of the American Chemical Society 1938, pp. 309-319.
Chen L F., et al. Synthesis of Nitrogen-Doped Porous Carbon Nanofibers as an Efficient Electrode Material for Supercapacitors, ACS vol. 6, No. 8 7092-7102.
Thirumal et. al. Synthesis and characterization of boron doped graphene nanosheets for supercapacitor, Synthetic Metals 220 (2016) 524-532 applications.
Da-Wei et. al. Synthesis and Electrochemical Property of Boron-Doped Mesoporous Carbon in Supercapacitor, Chem. Mater. 2008, 20, 7195-7200.
Jing Wei, et. al. A Controllable Synthesis of Rich Nitrogen-Doped Ordered Mesoporous Carbon for CO 2 Capture and Supercapacitors, Adv. Funct. Mater. 2013, 23, 2322-2328.
Lijun Yang et. al. Boron-Doped Carbon Nanotubes as Metal-Free Electrocatalysts for the Oxygen Reduction Reaction, Angew. Chem. Int. Ed. 2011, 50, 1-6.
Agata S 'liwak et. al. Nitrogen-containing chitosan-based carbon as an electrode material for high-performance supercapacitors, J Appl Electrochem (2016) 46:667-677.
Zhiwei Peng. et. al. Flexible Boron-Doped Laser-Induced Graphene Microsupercapacitors, ACS, Jun. 17, 2015.
iIanhua hOU et. al. Hierarchical Porous Nitrogen-DopedCarbon Nanosheets Derived from Silkfor Ultrahigh-capacity Battery Anodes and Supercapacitors, ACS, vol. 9 ' No. 3 ' 2556-2564 ' 2015.
hEl-Iing Iiu et. al. zIF-8 Dervied, Nitrogen-Doped Porous Electrodes of Carbon Polyhedron Particles for High Performance Electrosorption of Salt Ions, Scientific Reports, May 5, 2016.

\* cited by examiner

METHOD OF MAKING HETERO-ATOM DOPED ACTIVATED CARBON

CROSS-REFERENCE TO RELATED APPLICATIONS

This application claims the benefit of U.S. provisional application 62/396,171 filed on Sep. 18, 2016, and the provisional application is a continuation in part of U.S. patent application Ser. No. 15/208,336 filed on 12 Jul. 2016, U.S. patent application Ser. No. 15/242,113 filed on 19 Aug. 2016 and U.S. patent application Ser. No. 15/255,128 filed on 1 Sep. 2016, the contents of which are incorporated in their entirety.

FIELD OF TECHNOLOGY

This disclosure generally relates to a method of making heteroatom-doped activated carbon.

BACKGROUND

Several methods for making heteroatom-doped carbon have been found in literature. For example, boron (B)-doped carbons have been synthesized using a number of different methods and have recently been evaluated as electrode materials for electric double-layer capacitors (EDLCs) and $O_2$ reduction applications in fuel cells. Similarly, nitrogen (N)-doped carbons have also been evaluated as EDLC electrode materials, along with other applications like $CO_2$ capture and storage.

In one example, a mesoporous B-doped carbon was synthesized by co-impregnation of sucrose and boric acid into a mesoporous silica template (SBA-15), followed by carbonization and etching of the template (Wang, D. W., et. al., 2008). Maximum B-doping levels of 0.6 atomic % ware reported using this method, along with a specific surface area of 660 $m^2$/gm. Specific capacitance of EDLC devices using this B-doped carbon was found to be ~1.5 times higher than with boron-free carbon, using aqueous electrolytes.

U.S. Pat. No. 7,919,014 described a method to make B-doped activated carbon by mixing an activated carbon powder with a boric acid solution (maximum B % calculated for the mixture was 1.0 atomic %, although the actual atomic % of B in the final carbon was not reported). This mixture was then dried and heated to form the B-doped carbon. It is unclear whether B entered the carbon matrix with this technique or remained within surface functional groups.

Other methods used for synthesizing B-doped carbons include laser-induction and chemical vapor deposition. In the laser induction method (Peng, Z., et. al., 2015), boric acid was dissolved in poly(amic acid) solution, followed by condensation of the solution to form boric-acid-containing polyimide sheets. These sheets were then exposed to a $CO_2$ laser which converted the material into B-doped laser-induced graphene. Capacitance measurements on electrodes using this B-doped graphene resulted in values that were 3 times larger than similar measurements made on electrodes with non B-doped laser-induced graphenes. In another example, chemical vapor deposition (CVD) using benzene, triphenylborane (TPB) as the B source, and ferrocene as a catalyst, resulted in B-doped carbon nanotubes (BCNTs). Boron content was varied by using different TPB concentrations. These materials were used in fuel-cells for oxygen reduction reactions and showed improved performance with increasing boron content (Yang, L., et. al., 2011).

In another example, B-doped graphene nano-sheets (with a maximum of 2.56 atomic % B) were synthesized for use as electrode materials; and capacitance values were compared against similarly synthesized materials that were not doped with B. The capacitance values of the B-doped materials were 2 times higher than the non-B-doped materials, in aqueous electrolytes. In this case, the B-doped graphene nano-sheets were synthesized by first thermally reducing graphene oxide, followed by miring this with boric acid in ethanol and autoclaving at 150° C. (Thirumal, V., et. al., 2016).

There are several examples in the prior art describing methods to make nitrogen (N)-doped carbon from natural sources—due to the existence of precursor materials already rich in nitrogen content. For example, N-doped activated carbons were prepared from chitosan (a biomass precursor obtained from shrimp shells, naturally containing N) (Śliwak, A., et. al., 2016). The process involved high temperature carbonizing, followed by $CO_2$ activation. These carbons were found to have a maximum of 5.4 wt. % N—with specific surface area and specific capacitance values of 1080 $m^2$/gm and 147 F/gm (in aqueous electrolytes), respectively. Similar measurements made using commercially available activated carbon (Berkosorb®), with an N content of ~0.1 wt. %, exhibited lower capacitance values in aqueous electrolytes, despite having similar surface areas (1101 $m^2$/gm). In a further example, porous nitrogen-doped carbon nano-sheets were prepared via simultaneous activation and graphitization of biomass-derived natural silk. These carbons showed an N-content of 4.7 wt. %, a surface area of 2494 $m^2$/gm and specific capacitance values as high as 242 F/gm, in ionic liquid electrolytes [Hou, J., et. al., 2015].

While the presence of N in the carbons developed from natural sources has been shown to have a beneficial effect on performance (e.g. higher capacitance than non-nitrogen containing carbons with similar surface areas), there is little control over other impurities like Fe, Mn, Ni, Zn, S, Cl, etc., some of which need to be at levels less than 20 ppm for the carbon to be used in commercial EDLC applications.

N-doped carbons have also been made from synthetic starting materials. In one example, a nitrogen-doped porous carbon nanofiber (CNF) structure was synthesized with 4 to 12.14 atomic % N, by mixing the CNF with pyrrole and ammonium persulfate, and carbonizing at temperatures of 1100° C. (Chen, L. F., et. al., 2012). These carbons had specific surface areas of 562 $m^2$/gm and capacitance values that varied with the N-content (7.22 atomic % N showed the best capacitance). In another example, N-doped carbon was synthesized using a soluble resol as a carbon source, dicyandiamide as a nitrogen source, and a surfactant (Pluronic®F127) as a soft template. Following carbonization and pyrolysis (to remove the template), the material was chemically activated using KOH, to obtain a surface area of 494-586 $m^2$/gm. A maximum N-content of 13.1 wt. % was achieved and performance of these carbons for $CO_2$-capture applications (3.2 mmol/gm, at 298K, 1.0 bar) and EDLC applications (262 F/gm in aqueous electrolytes) was measured (Wei J, et. al., 2013).

In yet another example, N-doped carbon was synthesized from the well established urea-formaldehyde condensation reaction by adding furfuryl alcohol to the system prior to co-polymerizing the mixture (Liu, Z., et. al. 2015). This method of co-polymerization involved the polymerization of a furfuryl alcohol and a urea/formaldehyde system—simultaneously. There are several issues with this approach: (i) the kinetics of the urea/formaldehyde condensation reaction are different from the kinetics of the furfuryl alcohol polymerization reaction; (ii) during the carbonizing stage, the volatile organic compounds that are typically released here, are also different. This results in a non-homogeneous distribution of the nitrogen in the final carbon. This can be easily seen from the N wt. % data in this study. Specifically, a doubling of the ratio of furfuryl alcohol to the urea/formaldehyde solution is expected to result in a comparable reduction of the N content—all other process parameters being held constant. However, the published data shows the exact opposite trend, i.e. a reduction in the amount of urea (N-source) shows an increase in the N content of the final carbon. This can only be explained by the co-polymerization process having very different and individual characteristics. Specifically, if the N is not uniformly distributed (i.e. favoring one system over the other), and both these polymerized (albeit intermixed) solids carbonize at different rates, the end result can be an increase in the overall N content with a decrease in the N-source. Consequently, a single polymerization system is sought to ensure uniform distribution of the heteroatoms. Additionally, formaldehyde has been under increasing scrutiny from government and environmental groups due to its carcinogenic nature, and has been listed as a hazardous air pollutant under the US Clean Air Act (amended in 1990). Thus, systems without hazardous air pollutants like formaldehyde are desired.

Recently, N-doped carbon was made using a surfactant-controlled zeolitic imidazolate framework (ZIF-8) [Liu, N. L., et. al., 2016]. A solution of zinc nitrate was added to a solution of 2-methylimidazole and polyvinylpyrrolidone (PVP) at room temperature and aged for 10 hours. The resulting precipitate was washed and dried to form the ZIF-8 and was then carbonized in an inert atmosphere to result in N-doped carbon nano-particles. Measurements of capacitance using aqueous electrolytes resulted in 200 F/gm. A maximum N-doping of 15 wt. % was measured, along with a specific surface area of 798 $m^2$/gm. The various methods of doping carbon with nitrogen and boron described above are summarized in Table 1.

TABLE 1

Summary of B- and N-doped activated carbons (prior art).

| Carbon Source | Heteroatom source | Process | Target Applications | BET surface area | Heteroatom content | Capacitance/ (electrolyte) | Reference |
|---|---|---|---|---|---|---|---|
| 1 Sucrose | B = Boric acid | Templating | EDLC | <660 $m^2$/gm | B = 0.6 atomic % | <125 F/gm (aqueous) | Wang, D. W., et. al., 2008 |
| 2 Activated carbon | B = Boric acid | Thermal doping in Solid state | EDLC | Not measured | B = Not measured | EDLC not measured | U.S. Pat. No. 7,919,014 |
| 3 Graphene | B = Boric acid | B-doped Laser induced graphene | Capacitors for electronics | 191 $m^2$/gm | B = Not measured | 6.6 F/ml (solid state Polymer) | Peng, Z., et. al., 2015 |
| 4 Benzene | B = Tri-phenyl borane | CVD to make B-doped CNT | Catalysts for $O_2$ reduction | Not measured | B = <2.24 atomic % | Not measured | Yang, L., et. al., 2011 |
| 5 Graphite | B = Boric acid | Thermal doping in solid state | EDLC | Not measured | B = 2.56 atomic % | 113 F/gm (aqueous) | Thirumal, V., et. al., 2016 |
| 6 Chitosan | Naturally containing N | Carbonization | EDLC | 1080 $m^2$/gm | N = 8.3 wt. % | 147 F/gm (aqueous) | Sliwak, A., et. al., 2016 |
| 7 Biomass-derived natural silk | Naturally containing N | Simultaneous activation and graphitization | EDLC | 2494 $m^2$/gm | N = 4.7 wt. % | 242 F/gm (Ionic Liquid) | Hou, J., et. al., 2015 |
| 8 Carbon Nano fiber | N = Pyrrole and ammonium persulfate | Thermal doping in solid state | EDLC | <562 $m^2$/gm | N = 12.14 atomic % | 202 F/gm (aqueous) | Chen, L. F., et. al., 2012 |
| 9 Resol | N = dicyandiamide (DCDA) | Templating with pyrolysis | EDLC | <586 $m^2$/gm | N = 13.1 wt. % | 262 F/gm (aqueous) | Wei J, et. al., 2013 |
| 10 Formaldehyde + Furfuryl alcohol | N = Urea | Co-Polymerization | $CO_2$ capture | 2273 $m^2$/gm | N = 2.93 to 10.33 wt. % | Not measured | Liu, Z., et. al. 2015 |
| 11 Methyl-imidazole; Polyvinyl-pyrrolidone | N = Methyl-imidazole; Polyvinyl-pyrrolidone | Zeolite derived nano-particles | EDLC | <800 $m^2$/gm | N = 15 wt. % (surface) | <200 F/gm (aqueous) | Liu, N. L.,et al, 2016 |

There is need for a new simpler method to make heteroatom-doped carbons from synthetic starting materials. This method should not involve complex processing like templating, laser-processing, CVD, etc. (described in the prior art). Additionally, there is also a desire to eliminate carcinogenic chemicals like formaldehyde (described in the prior art), from the new simpler method.

SUMMARY

The instant application discloses a method of producing heteroatom-doped activated carbon in simple steps. In one embodiment, mixing a liquid furfuryl-functional-group compound (the carbon source) with a heteroatom containing compound (written in alternative language throughout the specification as the heteroatom source, heteroatom source containing compound or compounds) and a polymerization catalyst (catalyst) to make an activated heteroatom-doped carbon via a single stage polymerization reaction, a carbonization treatment and an activation treatment, is described. The carbon source is a liquid that can dissolve the heteroatom source and the catalyst. In another embodiment, if the heteroatom source is not soluble in the carbon source, the heteroatom source is first dissolved in an organic solvent (e.g. methanol, acetone, etc.) and then mixed with the carbon source, along with the catalyst to obtain the final heteroatom-doped carbon via the process steps described above. If the heteroatom containing compound is not soluble common organic solvents, then a water-based solution of the heteroatom compound is added to the liquid carbon source, followed by the catalyst and polymerization. In one embodiment, after the catalyst is added to the mixture of the heteroatom source and the liquid furfuryl-functional-group compound, polymerization is carried out over a temperature range of 25° C.-200° C., in air. The polymerized solid is carbonized by heating at temperatures between 600° C. and 800° C. under an inert atmosphere, and then activated—either chemically using our previously described process in U.S. patent application Ser. No. 15/255,128, or with activation methods typically used in the industry (example $CO_2$ or steam activation at temperatures typically between 900° C. and 1100° C.). In the case of the $CO_2$ or steam activation, the carbon is first heated to the activation temperature under an inert atmosphere of nitrogen or argon, and then the activating gas ($CO_2$ or steam) is used. Cooling is done under an inert atmosphere.

In another embodiment, an additive is also added to the carbon-source/heteroatom-source/catalyst solution, before polymerization. This additive is not soluble in the liquid carbon source, and is in the form of a fine powder. The additive is thoroughly mixed into the liquid before polymerization begins. The additive is a material that that enhances the performance of the activated carbon in the end application. For example, activated carbon that is used for EDLC electrodes is mixed with a high-conductivity carbon powder like carbon black or carbon nanotubes or graphene. These types of materials form the additives used in the current method. Specifically, carbon black, carbon nanotubes, carbon nanofibers, graphenes, and similar materials can call be added as additives to the carbon source in our method.

In another embodiment, the liquid carbon source comprises of a multitude of furfuryl-functional-group containing liquids. It has been shown earlier that furfural can act as a cross-linking agent in the curing step of a two-stage process using a combined furfural/furfuryl-alcohol system for making hard, chemically resistant resins for cements and coatings (U.S. Pat. No. 3,168,494). We have thus added furfural to furfuryl alcohol to utilize the cross-linking function of furfural to make a hard cross-linked polymerized solid; that is then carbonized and activated. In this embodiment, the heteroatom source is dissolved in one of the liquid furfuryl-functional-group compounds, while the catalyst is added to the other liquid furfuryl-functional-group compound. As in previous embodiments, if the heteroatom containing compound is not directly soluble in the carbon source, then it is first dissolved in an organic solvent or water.

In yet another embodiment, the catalyst and the heteroatom source are the same. This catalyst/heteroatom source is dissolved into the carbon source, followed by polymerization, carbonization and activation, to form the heteroatom-doped activated carbon. The characteristics of the combined heteroatom/catalyst source are that the compound has both an acidic nature—with a pKa (acid dissociation constant) value between 1 and 10, and also contains the desired heteroatom to dope the final carbon. Some examples of this compound are boric acid (B-heteroatom, with a pKa of 9.24), 2,3-pyridine dicarboxylic acid (N-heteroatom, with a pKa of 2.43); 2,4-pyridine dicarboxylic acid (N-heteroatom, with a pKa of 2.15); 3,5-pyridine dicarboxylic acid (N-heteroatom, with a pKa of 2.8).

In a further embodiment, the polymerization catalysts are first added to the liquid furfuryl-functional-group compound before the heteroatom containing compounds. Once again, the heteroatom compounds may be added in the form of a solution. The remaining process steps are similar to those described above.

In another embodiment, the polymerization catalysts are first dissolved into a solution containing the heteroatom compounds to make a catalyst/heteroatom compound solution. Subsequently, catalyst/heteroatom compound solution is added directly to the carbon source and processed as outlined earlier.

The heteroatom-doped carbons produced by these methods were measured for heteroatom doping levels and specific surface area. Also, in some cases, EDLC coin cells were fabricated using these carbons—for evaluation of charge/discharge curves and capacitance.

DETAILED DESCRIPTION

Recently, we have described a method to make activated carbon from furfuryl-functional-group containing liquid starting materials. The basic process involves:
a. Starting with furfuryl-functional-group compounds like furfuryl alcohol, furfural and acetylfuran (amongst others) as a carbon source, and
b. Mixing catalysts (silane as in U.S. Pat. No. 9,458,021, alumina powder as in U.S. patent application Ser. No. 15/208,336 or organic acids as in U.S. patent application Ser. No. 15/242,113) along with additives like carbon black into this carbon source, and polymerizing into a solid polymer;
c. Carbonizing the solid polymer and activating the carbonized solid (using physical activation like $CO_2$, and/or chemical activation described in U.S. patent application Ser. No. 15/255,128).

We have also shown (e.g. U.S. patent application Ser. Nos. 15/242,113 and 15/255,128) that the activated carbons synthesized by these methods are suitable for EDLC applications, having measured capacitance values of 126 F/gm in organic electrolytes (1 molar tetra ethyl ammonium—tetra fluoroborate in acetonitrile), along with surface areas in excess of 2900 $m^2$/gm and pore volumes in excess of 1.5 ml/gm. This method is now augmented to incorporate heteroatoms into the activated carbon, by adding heteroatom-containing compounds into the furfuryl-functional-group containing starting materials before polymerizing—followed by subsequent processing steps described above.

Boron-doped Activated Carbon

Figure 1A:
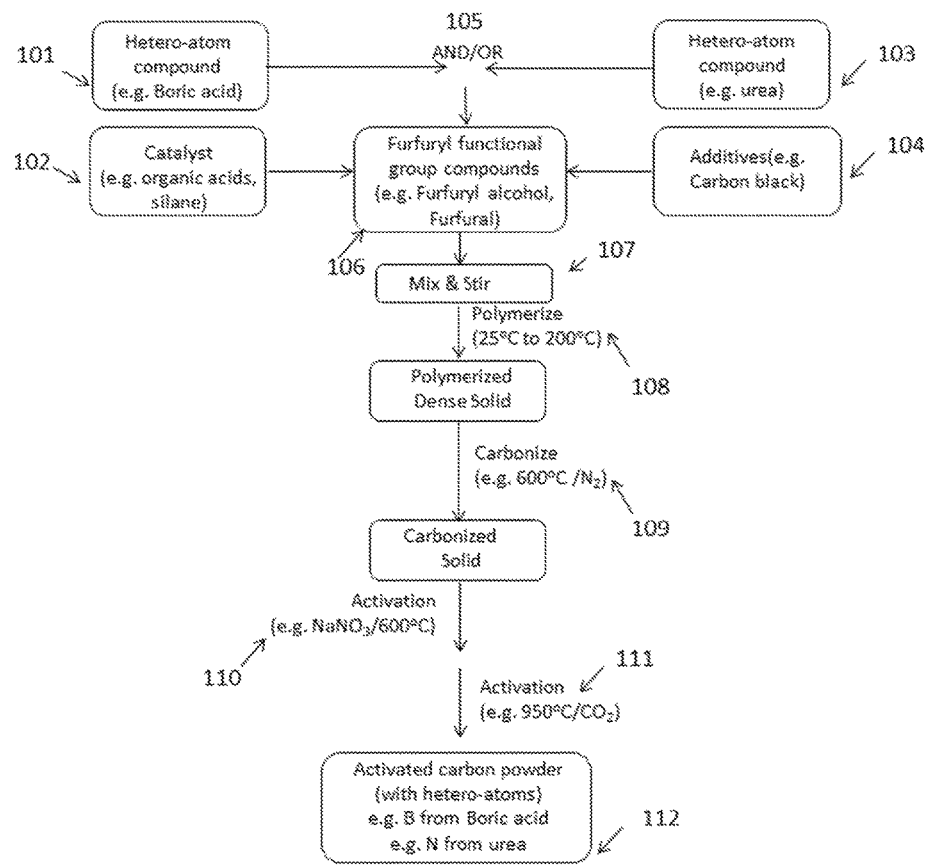
FIGS. 1A and 1B: Flow chart of a process to make N- and B-doped activated carbon.
Figure 1B:
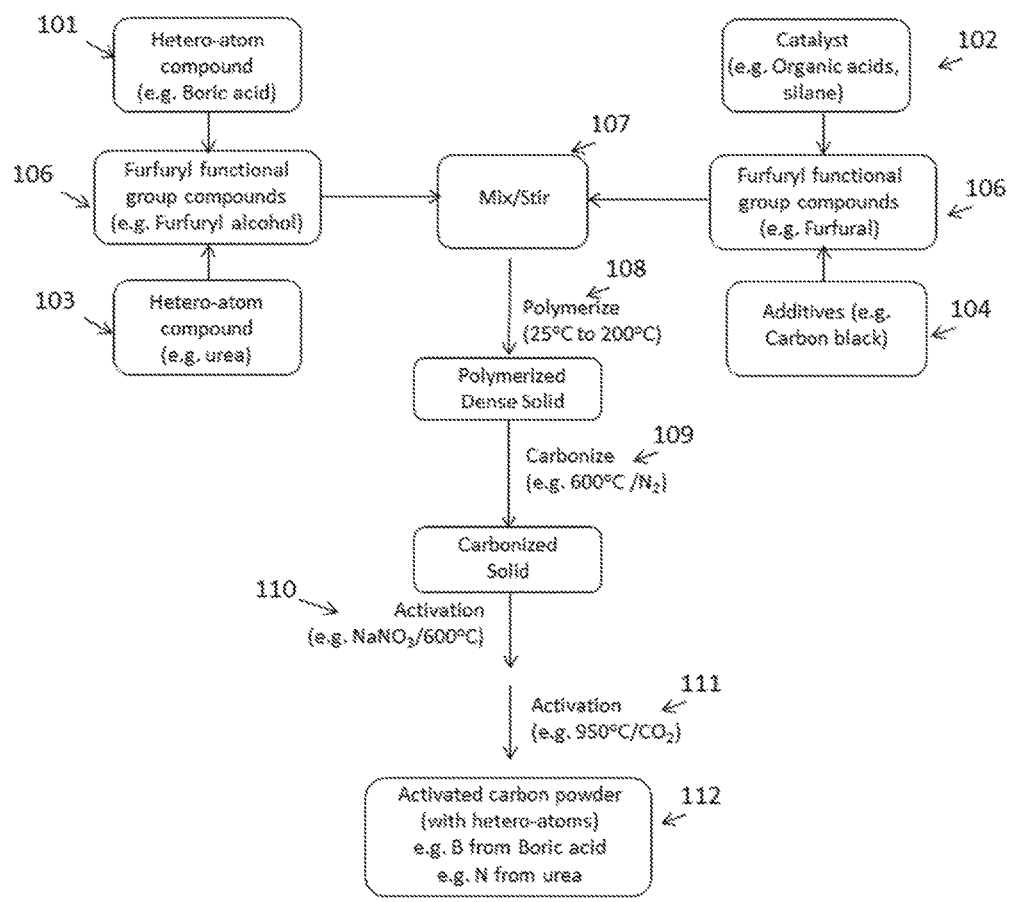

FIG. 1a and FIG. 1b describe the process and variations of the process to make this boron-doped activated carbon along with N-doped activated carbon. In one of the embodiments, the current method starts with the dissolution of the heteroatom sources (101) into the starting materials (106). We have mainly used furfuryl alcohol ($C_5H_6O_2$) as our starting material (carbon source), but have also evaluated furfural ($C_5H_4O_2$) and acetylfuran ($C_6H_6O_2$) with respect to their ability to dissolve the heteroatom source compounds. Other similar starting materials include 5-hydroxymethylfurfural ($C_6H_6O_3$). The heteroatom sources need to be soluble in these starting materials, either directly or in a solution of organic solvents. For B-sources, we have used boric acid ($H_3BO_3$) which has negligible solubility in furfuryl alcohol and furfural, is insoluble in acetylfuran, but is soluble in methanol and ethanol (other alcohols are viable options too). We have evaluated the solubility of boric acid in ethanol. We found 3 gm of boric acid to be completely soluble in 50 ml of ethanol at room temperature (solubility of boric acid is generally accepted to be 12 wt. % in ethanol and 22 wt % in methanol at room temperature).

Next, we evaluated the miscibility of the boric acid solution with the furfuryl-functional-group containing starting liquids. The boric acid solution was completely miscible in furfuryl alcohol, furfural and acetylfuran. Once the boric acid solution has been added to the carbon source, polymerization catalysts (102) were added to the carbon source. We have used oxalic acid, tartaric acid, maleic acid, benzoic acid and citric acid (individually or in combination), as the polymerization catalysts. Other organic acids like formic acid, lactic acid, acetic acid are also suitable as polymerization catalysts. After the addition of the polymerization catalysts, additives like carbon black (104) were added and the mixture and stirred thoroughly before being allowed to stand at room temperature to start the polymerization process (107). This was followed by heat treatments from 25° C. to 200° C. (108) to create a dense polymerized solid. With boric acid in solution in the carbon source, we have not found any significant change in the polymerization kinetics of the system. Polymerization conditions have been described earlier (U.S. patent application Ser. No. 15/242, 113), and are followed here to create a dense polymerized solid. The polymerized solid is then carbonized and activated to make the heteroatom-doped activated carbon (109, 110, 111, 112).

In one embodiment, 10 gm of boric acid was dissolved into 120 cc of ethanol and added to 141 cc of furfuryl alcohol to form a clear solution. To this, 5 gm of oxalic acid and 2.25 gm of carbon black were added. The mixture was polymerized at temperatures from 25° C. to 200° C., to make a dense polymerized solid.

We have also used a combination of furfuryl alcohol (106) and furfural (106) as the carbon source—with a boric acid solution (101) as the heteroatom source. The catalysts (102) in this case were a combination of organic acids (oxalic, tartaric and maleic) and the additive was carbon black. A dense polymerized solid was obtained after heat treatment from 25° C. to 200° C. Additionally, we have also evaluated tri-ethyl borate as a source for B, and since this is a liquid, it was mixed directly with furfuryl alcohol. The procedure is similar to that described above. After the mixing of tri-ethyl borate and furfuryl alcohol, the polymerization catalyst was added, and allowed to form a dense polymerized solid. Other sources for B may also be used and include other tri-alkyl borates, ammonium borate, boron acetate and $BF_3$ in MeOH. Any B-source that is not directly soluble in the liquid furfuryl-containing compounds as starting materials, is first dissolved in other organic solvents like methanol, ethanol or acetone, before addition to the carbon source.

The use of the boric acid solution as a combination B-source and polymerization catalyst was also evaluated. In one embodiment, 12 gm of boric acid was dissolved into 130 cc of ethanol and added to a combination of 45 cc of furfuryl alcohol and 20 cc of furfural. This solution was then held at room temperature (with a cover to minimize evaporation) to allow polymerization to occur. After several hours, the clear liquid had turned black indicating the start of a polymerization reaction and further holding at room temperature resulted in thickening of the liquid and eventually a very viscous material. This was polymerized by soaking at 60° C., 100° C., and 200° C., to produce a dense polymerized solid. The apparent density of this material was measured to be 1.44 gm/ml using a liquid displacement method.

Once a dense polymerized solid has been formed from any of the embodiments described above, the material is carbonized (109). This process is typically performed by heating under an inert atmosphere at temperatures between 600° C. and 800° C. The next step is an optional chemical activation step (110) that we recently described in U.S. patent application Ser. No. 15/255,128. We have found that the chemical activation step results in ultra-micropore sizes of <1 nm. Consequently, when these types of pores are desired in the final activated carbon, this chemical activation step is required. In one embodiment, the carbonized material was immersed in a dilute solution of 1.5M $NaNO_3$ in a combination of water and ethanol (equal parts). The carbonized material was then removed from this solution and directly heated to 600° C. for 1 hour under nitrogen, to form the ultra-micropores.

For a final physical activation step, the carbon is heated to temperatures between 900° C. and 1200° C. under a $CO_2$ atmosphere (111), although most of our examples utilized 950° C. or 1000° C. as the activation temperature. Steam activation can also be used and is typically performed at lower temperatures than $CO_2$ activation (800° C. to 1100° C.). After the activation step an activated carbon powder as heteroatom-doped activated carbon is obtained (112).

To evaluate the performance of these B-doped carbons, EDLC devices were fabricated in the 2032 coin-cell format and tested for capacitance. B concentration in the carbon material was measured using the ICP-MS (Inductively Coupled Plasma Mass Spectroscopy) technique. Finally, surface area of the activated carbons was also measured using the BET (Brunauer, Emmett, and Teller) method (Brunauer, S., et al. 1938), along with measurements of pore volumes.

Nitrogen-Doped Carbon

For N-doped carbon, we have used urea as an N-source and found moderate solubility (8.5 wt. %) in furfuryl alcohol at room temperature. In one embodiment, 3 gm of urea powder (103) was dissolved into 30 ml of furfuryl alcohol at room temperature (106). Following this, 7 gm of maleic acid (102) was added and stirred (107) into solution at room temperature. After holding at room temperature for few hours, the solution started darkening in color signifying the onset of the polymerization reaction (108). At this stage, 0.45 gm of carbon black (104) was added and the mixture allowed standing at room temperature until it thickened and a pasty solid was obtained. This was then treated at 48° C., 100° C., and 200° C. to obtain a polymerized solid. In another embodiment, cross-linking agents like furfural are added to the furfuryl-alcohol/urea/polymerizing-catalyst solution described in the previous embodiment.

In another embodiment, a solution containing urea is used as the N-source (103). Urea was found to be negligibly soluble in organic solvents like ethanol (only ~5 gm urea in 100 ml). Urea is however highly soluble in water—with about 108 gm of urea dissolving in 100 ml of water at 20° C. (Stumpe, et. al., 2007). To prepare a urea/water solution for use in our system, 25 gm of urea were dissolved in 35 ml of water by stirring at room temperature, resulting in a solution of 53 ml (with a density of 1.13 gm/ml). This urea solution (with a molar concentration of 11.9) was stirred until a clear solution was obtained and was then used as the nitrogen source. This 11.9M urea solution is completely miscible in furfuryl alcohol, but not miscible into furfural.

In one embodiment, 30 ml of furfuryl alcohol was mixed with 4.32 gm of maleic acid and 1.68 gm of tartaric acid. 15 ml of a urea/water solution (11.9M) was then added, followed by 0.75 gm of carbon black. The mixture was allowed to stand at room temperature followed by polymerization heat treatments (25° C. to 200° C.) to make a dense polymerized solid.

In another embodiment, the organic acids used to catalyze the polymerization reaction of furfuryl alcohol, are added to the urea/water solution first. This solution is then added to the furfuryl alcohol and allowed to polymerize. In this embodiment, a urea solution was first made by adding 10 gm of urea to 30 cc of water. Next 15 gm of tartaric acid was stirred into solution, and 20 cc of this solution was added to 30 cc of furfuryl alcohol to form a clear solution. Thereafter, 4 gm of maleic acid powder was dissolved into the liquid, followed by the addition of 0.5 gm of carbon black. The mixture was allowed to stand at room temperature and thickened into a pasty mass that held its shape when tilted. It was then heated at 48° C., 80° C., and 200° C. to form a hard polymerized solid suitable for carbonization and activation.

In yet another embodiment, a urea/water solution was prepared by dissolving 10 gm of urea into 30 cc of water at room temperature. Once a clear solution was obtained, 10 gm of citric acid was added and stirred into the solution. Next, 20 cc of this solution was added to 30 cc of furfuryl alcohol, followed by 4 gm of maleic acid and 0.5 gm of carbon black. This mixture was then directly heated to 48° C., 120° C., and 200° C. to make a dense polymerized solid.

Of the various organic acids used in our system, benzoic acid was found to be insoluble in the urea/water solution, while the addition of oxalic acid to the urea/water solution resulted in a white precipitate. Tartaric acid, maleic acid, and citric acid were found to be soluble in the urea/water mixture. Other organic acids can also be used, after first evaluating their solubility in the urea/water solution and suitability as a catalyst for the polymerization of furfuryl alcohol.

In another embodiment, dimethyldichlorosilane ($C_2H_6Cl_2Si$) was used as the polymerization catalyst for a furfuryl-alcohol urea solution (i.e. urea directly in solution in furfuryl alcohol). This solution was polymerized, followed by carbonization and activation. If no etching step is used to remove the residual Si that is left after the carbonization step, the final carbon will contain both Si and N as dopants. Chemical analysis using PIXE (proton-induced X-ray emission) methods on similar furfuryl-functional-group containing starting materials with dichlorodimethylsilane as a catalyst (described in U.S. Pat. No. 9,458,021) showed the presence of Si in the final carbon, but did not reveal any residual chlorine (from the silane). This embodiment cannot be used with a urea/water solution, since the presence of water will result in the hydrolysis of the silane.

Hexamethylenetetramine ($C_6H_{12}N_4$) was also evaluated as a potential N-source. The solubility limit of $C_6H_{12}N_4$ in furfuryl alcohol was found to be 26 gm in 100 cc, at room temperature. 4 gm of $C_6H_{12}N_4$ was dissolved in 35 cc of furfuryl alcohol, followed by 8 gm of maleic acid. Next, 0.8 gm of carbon black was added and the mixture allowed to stand at room temperature for polymerization to occur. Further heating at temperatures from 25° C. to 200° C., resulted in a dense polymerized solid.

Other N-sources that can be used in the furfuryl-alcohol system include $NH_3OH$, nitric acid ($HNO_3$), acrylonitrile ($CH_2CHCN$), hexamethylenediamine ($C_6H_{16}N_2$) and some pyridines, amines, and azides. All of these N-sources need to either be liquid or soluble in solvents compatible with the liquid carbon source.

The carbon source materials used to make our N-doped carbons include furfuryl alcohol, furfural, 2-acetylfuran, and 5-hydroxymethylfurfural. Both acetylfuran and hydroxymethylfurfural melt at ~30° C., so working with these starting materials involves using temperatures slightly above room temperature in colder climates. Furthermore, urea is insoluble in furfural and acetylfuran. An 11.9M solution of urea in water was found to be immiscible in acetylfuran and furfural at room temperature. When heated to 120° C., furfural and the urea solution were still not miscible. When using furfural as the starting material, furfuryl alcohol may be added to the furfural/urea/water solution at room temperature, to dissolve the urea/water solution.

In another embodiment, 10 cc of furfural was added to 20 cc of furfuryl alcohol and 20 cc of a urea/water solution (11.9M) to form a clear solution. 3 gm of maleic acid was then dissolved in the solution followed by 0.45 gm of carbon black. The mixture was allowed to stand at room temperature till it formed a pasty solid and was then heated at 48° C., 80° C., 120° C., and 200° C. to form a dense polymerized solid. In another embodiment, 15 cc of a 1:1 immiscible mixture of furfural and 11.9M urea solution in water, was added to 30 cc of furfuryl alcohol. Next, 4 gm of maleic acid was added, followed by 0.75 gm of carbon black. The mixture was then allowed to stand at room temperature till a pasty solid was formed. Polymerization was completed by heating from 25° C. to 200° C.

Acetylfuran was also used as a carbon source for the method described in this application. The organic acids are selectively soluble in acetylfuran (e.g. oxalic acid will dissolve into acetylfuran, but benzoic acid does not). In one embodiment, 20 cc of acetylfuran was mixed with 12 cc of an 11.9M urea solution (in water). On mixing, a whitish residue was created. Next, 20 cc of furfural was added to the mixture and resulted in a clear solution. Next, 2 gm of oxalic acid was added to the solution and dissolved by stirring at room temperature. This was followed by 0.4 gm of carbon black and 10 cc of a maleic acid/urea/water solution (prepared by mixing 30 cc of water with 10 gm of urea and 5 gm of maleic acid). The mixture was allowed to stand at room temperature and started polymerizing into a pasty solid. It was then heated at 48° C., 100° C., and 200° C. to make a dense polymerized solid.

Other nitrogen sources like hexamethylenetetramine were also evaluated with furfural and acetylfuran, but it was found to be insoluble in both. Others skilled in the art may recognize similar nitrogen source compounds that may be soluble and hence usable as N-sources in our system.

Once a dense polymerized solid has been formed from any of the embodiments described above, the material is then carbonized. This process is similar to that described for the B-doped carbons. Additionally, the optional chemical activation step, also described for the B-doped carbons, can be used for the N-doped carbons as well.

For a final physical activation step, the carbon is heated to temperatures between 900° C. and 1200° C. under a $CO_2$ atmosphere. Steam activation can also be used and is typically performed at lower temperatures than $CO_2$ activation (between 800° C. and 1100° C.). Nitrogen concentration in the carbons is measured using the CHN-method (ASTM D5291). As with the B-doped carbons, the surface area of the N-doped activated carbons was measured using the BET method.

Finally, the process described here can also be used to make N and B co-doped carbons. For this embodiment, the process involves adding a boron source like boric acid in ethanol (101), to the furfuryl-containing starting materials (106), followed by the organic acid catalysts (102). After the mixture is stirred for at least 30 mins, the nitrogen source (103) is added (105) and the mixture is stirred (107) and polymerized (108). The rate of the polymerization reaction will depend on the amount of organic acids, urea, and boric acid, compared to the amount of furfuryl alcohol. Other combinations may also be used, including increased boric acid and urea concentrations or different B and N sources.

EXAMPLE 1

In this particular embodiment of the method, we added 100 cc of tri-ethyl borate (T59307, Sigma Aldrich, St. Louis, Mo.) to a combination of 125 cc of furfuryl alcohol and 150 cc of acetone (HPLC grade). The mixture was then thoroughly stirred at room temperature for 30 minutes, and 30 ml of dichlorodimethylsilane (440272, Sigma Aldrich, St. Louis, Mo.) was added slowly over a period of 30 minutes while stirring. The mixture was then covered with a lid to minimize evaporation losses and allowed to stand at room temperature for several hours. The mixture started polymerizing at room temperature and was held there until the rate of weight loss approached zero. Next, to complete the polymerization, the material was directly subjected to a 200° C. treatment, under air, until the rate of weight loss was negligible. Next, the polymerized material was subjected to a carbonization treatment. The material was loaded onto a quartz boat (10 cm long by 4 cm wide) that was inserted into a tube furnace (model GSL-1100X, MTI Corporation, Richmond, Calif.). Carbonization was done at 600° C., under nitrogen. Next, the carbonized material was activated. This was also done in a quartz tube furnace, with the carbon being heated up to the activation temperature of 1000° C. under nitrogen. $CO_2$ flowing at 3.4 liters/minute, was used to activate the carbon, until 23% weight loss was obtained (77% yield).

To evaluate the amount of boron in the final activated carbon, we have used Inductively Coupled Plasma Mass Spectrometry (ICP-MS) techniques to measure the B-content. With this technique, acid digestion of the sample is used to make a solution that is atomized with argon gas into hot plasma. The sample is then excited, emitting light wavelengths characteristic of its elements. The technique has a detection limit of <1 ppm. Using ICP-MS, we measured 2.97 wt. % of B in the as-activated sample (Table 2), indicating that tri-ethyl borate is a suitable B-source, for making B-doped carbons from the furfuryl-functional group containing liquid starting materials. This particular example also includes Si as a dopant in the carbon (from the dichlorodimethylsilane catalyst).

EXAMPLE 2

In this embodiment of the method, 150 cc of Furfuryl alcohol (W249106, >=98%, Sigma-Aldrich, St. Louis, Mo.) was stirred for few minutes in a glass jar using an overhead stirrer operating at around 200 rpm. Next, 10 gm of boric acid —$H_3BO_3$— (B6768 Sigma Aldrich, St. Louis, Mo.) powder was added to the furfuryl alcohol and the mixture, along with 35 cc of reagent alcohol (241000200, Pharmco-Aaper, Shelbyville, Ky.). The alcohol composition was 90.65% ethanol, 4.53% methanol and 4.82% isopropyl alcohol. The mixture was stirred until all the boric acid was in solution. Next, 2.25 gm of carbon black (C-NERGY SUPER C45) was added, along with 2 gm of citric acid (251275, Sigma Aldrich, St. Louis, Mo.), and the mixture stirred for an additional 160 minutes. It was then allowed to stand at room temperature, under air, until no further significant weight loss was observed and a pasty solid material was obtained. Following this, the material was subjected to heat treatments at 48° C., 78° C., 120° C., and 200° C., all under air, to create a dense polymerized solid.

Next, the polymerized solid was carbonized at 600° C. for 1 hour under nitrogen in a quartz tube furnace. The carbonized material was then subjected to a chemical activation method described in an earlier filing (U.S. application Ser. No. 15/255,128). This process involved immersing the carbonized material into a solution of $NaNO_3$ in water and alcohol, followed by heat treatments and washing. Accordingly, a solution of 25 gm of $NaNO_3$ (Lab-Pro ZS0655, Sunnyvale, Calif.) in 100 cc of de-ionized water (resistivity of 18.01 megohm-cm) and 100 cc of reagent alcohol (241000200, Pharmco-Aaper) was made at room temperature. The carbonized material was immersed in this solution for several hours under air. During this time, the mixture was ultrasonically vibrated for 60 minutes. Next, the carbonized material was removed, rinsed and heated to 200° C. under air for several hours, followed by boiling and rinsing steps (in DI-water) to remove residue from the $NaNO_3$ treatment. Next, the material was activated in a quartz tube furnace at 950° C. with $CO_2$ flowing through the tube at 3.4 liters/min. Heating was continued until 21% of the original weight of the carbon remained (i.e. burn-off ~79%, by weight).

Measurement of the surface area of this activated carbon powder was done using the BET (Brunauer, Emmett, and Teller) method. Measurements were made on a Micromeretics TriStar™ II 3020 instrument, using nitrogen as the adsorptive gas. Nitrogen isotherms were obtained at 77K after the samples were degassed for 1 hour at 90° C., followed by 16 hours at 300° C. The isotherms were fitted to the BET equation to obtain surface area. The results are shown in Table 3. Boron content was measured by ICP-MS techniques and the results are also included in Table 3, indicating that Boric-acid/ethanol solution is also a suitable heteroatom source for B-doped carbons made from furfuryl-functional-group containing liquid starting materials.

TABLE 2

Properties of B-doped activated carbon prepared by methods described in example 1.

| Example | Carbon source | Heteroatom source | Catalyst | $CO_2$ activation yield | Boron content |
|---|---|---|---|---|---|
| 1 | Furfuryl alcohol | Tri-ethyl borate | Dichloro-dimethylsilane | 77% (23% burn-off) | 2.97 wt. % |

TABLE 3

Properties of B-doped activated carbon prepared by methods described in example 2.

| Example | Carbon Source | Heteroatom source | Catalyst | $CO_2$ activation yield | BET area ($m^2$/gm) | Boron content (wt. %) |
|---|---|---|---|---|---|---|
| 2 | Furfuryl alcohol | Boric acid/ ethanol | Organic acid | 21% | 2624.52 | 0.45 |

EXAMPLE 3

This embodiment of the method utilizes similar ratios of boric acid to furfuryl alcohol but uses larger quantities of organic acid catalysts to polymerize the boric-acid/furfuryl-alcohol mixture. Specifically, 10 gm of boric acid (Sigma Aldrich) was dissolved in 100 ml of reagent alcohol (90.65% ethanol, 4.53% methanol, and 4.82% isopropyl alcohol), by stirring for 30 minutes at room temperature. Separately, 141 cc of Furfuryl alcohol (Sigma-Aldrich) was stirred for few minutes in a glass jar using an overhead stirrer operating at around 200 rpm. Next, the boric acid solution was added to the furfuryl alcohol and the solution was stirred for an additional 30 minutes. Then, 4.93 gm of oxalic acid (75688, anhydrous, ≥99.0%, Sigma-Aldrich, St. Louis, Mo.) and 2.25 gm of carbon black (C-NERGY SUPER C45) were added to this solution and stirring was continued for another 60 minutes. The mixture was then allowed to stand at room temperature for several hours until the rate of weight loss was negligible. This was followed by heat treatment at 80° C., under air, which was continued until the rate of weight loss became negligible. The solid was then heated at 120° C. and 200° C., under air, to create a polymerized solid.

Next, the polymerized material was prepared for carbonization at 600° C. This was done in one step by soaking at 600° C. under nitrogen, in a quartz tube furnace. The carbonized material was then subjected to our chemical activation step. A solution of 25 gm of $NaNO_3$ in 100 cc of de-ionized water and 100 ml of reagent alcohol, similar to that described in Example 2. The carbonized material was immersed in this solution and allowed to soak for several hours under air, with a cover to minimize evaporation losses of the liquid. It was then removed from the solution, rinsed in de-ionized water and heated in an oven at 200° C. for several hours, also under air. Next, the carbon was thoroughly washed by boiling in de-ionized water and rinsing several times to remove any remaining $NaNO_3$ or related by-products. The carbon was then further activated using $CO_2$. This was done at 950° C., in a quartz tube furnace with $CO_2$ flowing through the tube at a rate of 3.4 liters/min. Activation yield of 25% was achieved (i.e. burn-off 75%) for the $CO_2$ activation step.

Figure 2:
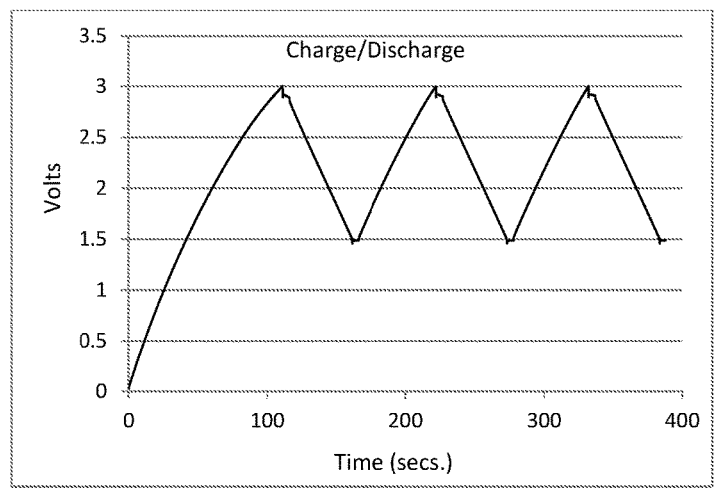
FIG. 2: A representative set of charge/discharge curves from coin cells with B-doped carbons obtained from example 3.

We have then used this boron-doped activated carbon to build EDLC devices and evaluated the electrical performance of these devices. The material was first ground down to an average size of ~20 to 30 microns in preparation for EDLC electrode manufacturing. In this case, a dry electrode method was used (mixing TEFLON® powder—PTFE 6C from DuPont Corporation, Wilmington, Del.—with the carbon; followed by rolling onto aluminum foil substrates). 2032 sized coin-cell electrodes were punched out and fabricated into coin cells using a standard 1M tetraethyl ammonium tetra fluoroborate/Acetonitrile organic electrolyte, commonly used in commercial EDLC manufacturing (B-doped carbon in both electrodes). Charge/discharge experiments were carried out and capacitance values were calculated from the slope of the discharge curves. FIG. 2 shows a representative set of charge/discharge curves for EDLC devices fabricated using the carbons from this embodiment. The average value of the specific capacitance measured from the discharge curves is shown in Table 4. This indicates that B-doped carbons made from Boric-acid/furfuryl-functional-group containing liquid starting materials, are also capable of high specific capacitance in EDLC applications.

TABLE 4

Properties of a B-doped carbon prepared by techniques described in example 3.

| Example | Carbon source | Heteroatom source | Catalyst | $CO_2$ activation yield | Specific capacitance (F/g) |
|---|---|---|---|---|---|
| 3 | Furfuryl alcohol | Boric acid/ ethanol | Organic acid | 25.1% | 121.2 |

EXAMPLE 4

In this embodiment. 6 gm of Boric acid was dissolved in 105 ml of reagent alcohol (90.65% ethanol, 4.53% methanol, and 4.82% isopropyl alcohol), by stirring at room temperature. Separately, 45 ml of Furfuryl alcohol (Sigma-Aldrich) was stirred for few minutes in a glass jar using an overhead stirrer operating at around 200 rpm. Next, the boric acid solution was added to the furfuryl alcohol and the solution was stirred to thoroughly mix it. Next, 3 gm of Boric acid was mixed into 27.5 ml of the reagent alcohol and added to 20 ml of Furfural. This mixture was stirred using an overhead stirrer till all the Boric acid was in solution. Then, the furfural/Boric-acid solution was added to the furfuryl-alcohol/Boric-acid solution and an additional 3 gm of Boric acid in 50 ml of reagent alcohol was added to the mixture. This solution was then polymerized at 60° C., under air—until the rate of weight-loss approached zero. A solid material was formed at this stage and it was further heated at 120° C. and 200° C. to complete the polymerization process. Next, the polymerized material was carbonized at 600° C. for 60 mins under nitrogen, followed by $CO_2$ activation at 950° C., both in a quartz tube furnace. Activation was carried out till a weight loss of 54% was achieved. The B-content of the activated carbon was then measured using the ICP-MS method, and a value of 2.9 wt. % was reported (shown in Table 5). It can be seen from this example that the B-source used here (i.e. Boric acid) is also a suitable catalyst for the polymerization of the furfuryl-functional-group containing liquid starting materials (a combination of furfural and furfuryl alcohol in this case), with no additional catalysts being required here.

TABLE 5

Properties of a B-doped carbon prepared by techniques described in example 4.

| Example | Carbon source | Heteroatom source | Catalyst | $CO_2$ activation yield | Boron content (wt. %) |
|---|---|---|---|---|---|
| 4 | Furfuryl alcohol + Furfural | Boric acid/ ethanol | None | 46% | 2.90 |

EXAMPLE 5

In this embodiment of the method, 50 cc of furfural ($C_5H_4O_2$) (185914, Sigma Aldrich, St. Louis, Mo.) was stirred for a few minutes in a beaker with an overhead stirrer operating at 200 rpm under air. Next, a combination of organic acids was added to the furfural, starting with 1.27 gm of oxalic acid (75688, anhydrous, ≥99.0%, Sigma-Aldrich, St. Louis, Mo.), followed by 1.63 gm of maleic acid, (M0375, ≥99.0% (HPLC), from Sigma Aldrich St.

Louis, Mo.) and 2.1 gm of tartaric acid (T109, ≥99.5%, from Sigma Aldrich St. Louis, Mo.). After all the acid powders were in solution, stirring was continued for another 90 minutes. The solution was then allowed to stand at room temperature for several hours, before 0.75 gm of carbon black (C-NERGY SUPER C45 from Imerys, Willebroek, Belgium) was added. Next, 36 gm of urea powder (U5378, Sigma Aldrich, St. Louis. Mo.) was added to 35 cc of de-ionized water to make a solution. This solution was then added directly to the furfural/organic acid mixture. This mixture of the two solutions was then thoroughly mixed using an overhead stirrer. The mixture was then allowed to soak at room temperature, until it became a pasty solid. This solid material was then heated at 78° C., 120° C., and 200° C., under air. Heating at each temperature was carried out until the rate of weight loss of the material approached zero, before the next treatment was started. Next, the solid polymerized material was carbonized in a quartz tube furnace by heating at 600° C. for 1 hour, under nitrogen. The carbonized material was then activated in the quartz tube furnace at 950° C. with $CO_2$ flowing through the tube at 3.4 liters/min. Activation was continued until a yield of 21.3% was obtained (i.e. a 78.7% burn-off, by weight).

This activated carbon with N-doping was then evaluated for N-content using CHN analysis techniques. The sample was combusted in oxygen, carried through the system by helium, converted and measured as $CO_2$, $H_2O$, and $N_2$—per the ASTM D5291. The product gases were separated and detected by thermal conductivity or IR with a detection limit of 0.10%. The results for N-content are shown in Table 6.

Finally, we have also measured the surface area of this activated carbon powder using the BET method. Measurements were made on a Micromeretics TriStar™ II 3020 instrument, using nitrogen as the adsorptive gas. Nitrogen isotherms were obtained at 77K after the samples were degassed for 1 hour at 90° C., followed by 16 hours at 300° C. The isotherms were fitted to the BET equation to obtain surface area. The results are included in Table 6, indicating that urea is a suitable N-source for making N-doped carbons from furfuryl-functional-group containing liquid starting materials, and that these N-doped carbons can also be activated to high specific surface areas—suitable for EDLC applications.

TABLE 6

Properties of N-doped activated carbon prepared by methods described in example 5.

| Example | Carbon source | Hetero-atom source | Catalyst | Activation yield | BET area ($m^2$/gm) | N content wt. % |
|---|---|---|---|---|---|---|
| 5 | Furfural | Urea/water | Organic acids | 21.3% | 2546 | 3.12 |

EXAMPLE 6

In this embodiment, 150 cc of Furfuryl alcohol (W249106, >=98%, Sigma-Aldrich, St. Louis, Mo.) was stirred for few minutes in a glass jar using an overhead stirrer operating at around 200 rpm. Next, 14 gm of urea (U5378, Sigma Aldrich, St. Louis. Mo.) was added and stirred for 1 hour to dissolve it. Next, 20 gms of maleic acid was added and stirred for an additional 1 hour, before 2.25 gms of carbon black (C-NERGY SUPER C45 from Imerys, Willebroek, Belgium) was added. The mixture was then heated at 35° C., 48° C., 80° C., 120° C., and 200° C., under air to form a dense polymerized solid.

The polymerized solid was then carbonized by heating it to 600° C. under nitrogen. Activation was carried out at 1000° C. under $CO_2$ until 74% weight-loss was obtained. For this activated carbon, we measured the iodine number (per ASTM D4607) to be 1592 mg/gm (shown in Table 7). This is similar to the industry-standard activated carbon used for EDLC electrodes (namely, the YP-50 brand of carbon from Kuraray Chemical Co. in Japan).

Figure 3:
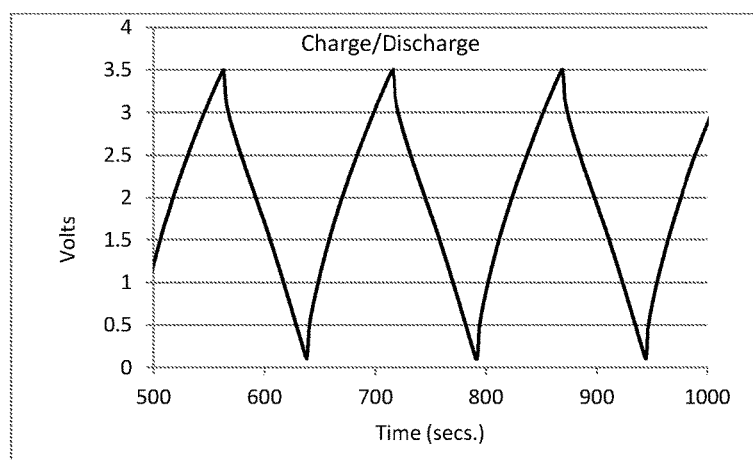
FIG. 3: A representative set of charge/discharge curves from coin cells with N-doped carbon and un-doped carbons, obtained from example 6.

To evaluate the performance of our N-doped carbons, we have also tested it in EDLC configurations. Specifically, the carbon was ground to a $d_{50}$ size of ~5 μm, and a slurry method using SBR/CMC (Styrene Butadiene Rubber/Carboxy Methyl Cellulose) was employed to make electrodes (on aluminum foil substrates). These electrodes were then cut to fit in 2032 sized coin cells. Also, similar electrode manufacturing methods were used to make electrodes with the industry-standard YP-50 brand of carbon. Two configurations of coin cells were then made (a) using YP-50 carbon for both electrodes and, (b) one YP-50 electrode and one N-doped carbon electrode (made from carbon obtained from the process described in this example). Charge/discharge curves were obtained over several 100's of cycles and the capacitance of the cells was calculated from the slope of these curves. FIG. 3 shows a representative set of charge/discharge curves for the second configuration described above. Discharge capacitance (measured from the slope of the discharge curve) was found to be 0.253 Farads/coin-cell. Similar measurements on the symmetric YR-50 coin cells resulted in a discharge capacitance of 0.25 Farads/coin-cell. This indicates the suitability of using urea as an N-source to make N-doped carbons (from furfuryl-functional-group containing liquid starting materials), suitable for EDLC applications. Also, this N-doped carbon is shown to be a suitable material for asymmetric EDLC devices using N-doped and un-doped carbons for the two electrodes.

TABLE 7

Properties of N-doped activated carbon prepared by methods described in example 6.

| Example | Carbon source | Hetero-atom source | Catalyst | $CO_2$ Activation yield | Iodine (mg/gm) | Capacitance/coin-cell (F) |
|---|---|---|---|---|---|---|
| 6 | Furfuryl alcohol | Urea | Organic acid | 26% | 1592 | 0.253 |

EXAMPLE 7

In this embodiment, we have built an asymmetric coin-cell capacitor by using one B-doped electrode (as the cathode) and an N-doped electrode as the anode. The N-doped carbon is from Example 6, while the B-doped carbon is made as follows. 10 gm of Boric acid was first dissolved in 108 ml of reagent alcohol. This was added to 150 ml of furfuryl alcohol, followed by 6.3 gm of tartaric acid, 4.89 gm of maleic acid and 3 gm of oxalic acid. The mixture was stirred until all the acids were in solution. Next 2.25 gm of carbon black was added and stirred for an additional 2 hours. Following this, the mixture was allowed to stand at room temperature until it thickened and the rate of weight loss approached zero. Polymerization was completed by heating at 85° C., 120° C. and 200° C. Next, carbonization was done at 600° C. for 1 hour under nitrogen, followed by $CO_2$ activation at 950° C. (activation yield of 32%).

This B-doped carbon (similar to that obtained in examples 2 and 3) was used to make EDLC electrodes using the slurry method described earlier (example 6). 2032 coin cells were made with the B-doped carbon as the cathode and the N-doped carbon (from example 6) as the anode. Charge/discharge curves were measured and capacitance of the coin cells was measured to be in 0.25 Farad/coin-cell. Charge/discharge curves from this asymmetric EDLC are similar to those shown in FIG. 5. Details of this embodiment are shown in Table 8. This example indicates the feasibility of making asymmetric EDLC devices from a B-doped and an N-doped electrode.

TABLE 8

Properties of N-doped and B-doped carbon used for asymmetric EDLC devices.

| Example #7 | Carbon source | Heteroatom source | Catalyst | $CO_2$ Activation yield | Capacitance/ coin-cell (F) |
|---|---|---|---|---|---|
| N-doped | Furfuryl alcohol | Urea | Organic acid | 26% | 0.25 |
| B-doped | Furfuryl alcohol | Boric acid/ ethanol | Organic acid | 32% | |

We have discussed a number of examples and embodiments of the invention and those skilled in the art will recognize that modifications, permutations, additions, and sub-combinations can be made to produce the same final result. It is therefore intended that any claims hereafter introduced based on the descriptions and drawings detailed above are interpreted to include all such modifications, permutations, additions, and sub-combinations to be within their spirit and scope. As used herein, the term "embodiment" means an embodiment that serves to illustrate by way of example but not limitation.

INDUSTRIAL APPLICABILITY

Benefits of producing both B-doped and N-doped carbons is clear from the data in table 1. Relevant applications of these heteroatom-doped carbons include electrodes for capacitors like electric double layer capacitors (EDLCs), carbon-dioxide capture (in the case of N-doped carbons), and oxygen reduction in fuel cells (for B-doped carbons). Besides these, carbons doped with heteroatoms like sulfur have also been used for EDLC electrode applications, while silicon-doped carbons are attractive for hydrogen storage. For the EDLC applications, typical capacitance values for the carbons used today are 100 farads/gm with organic electrolytes, 200 farads/gm with aqueous electrolytes. While ionic electrolytes are under development, and aqueous electrolytes only support very low cell voltages, organic electrolytes are the most common industrial configuration of the large EDLC devices today. Also, the acceptable surface area values of carbons for these EDLC applications are between 1500 and 1600 $m^2$/gm. It is clear from table 1, however, that none of the described methods for B-doped carbons have resulted in activated carbon with high surface area or high capacitance. Hence the need exists for a simple process that produces B-doped carbons with high surface areas and high capacitance values for use in EDLC devices. This is shown in examples 2 and 3 of the instant application.

For N-doped carbons (shown in table 1) derived from synthetic starting materials, the measured surface areas are typically low. For the method that resulted in high surface area (synthetic starting materials), the EDLC performance was not measured, but more importantly, a hazardous air pollutant was used as one of the starting materials. Consequently, a simple process to make N-doped activated carbon is desired that results in a high surface area and does not use hazardous air pollutants as starting materials. This is shown in example 5 of the instant application.

Furthermore, constructing an 'asymmetric' EDLC with one B-doped activated carbon electrode combined with an un-doped carbon electrode, or one N-doped activated carbon electrode combined with an un-doped carbon electrode, or one B-doped activated carbon electrode combined with one N-doped activated carbon electrode, has the promise of improving performance over EDLC devices made from un-doped carbons. Asymmetric EDLC devices are described in examples 6 and 7 of the instant application.

What is claimed is:

1. A method of producing a heteroatom-doped activated carbon, comprising:
    a) mixing a liquid furfuryl-functional-group containing compound with the heteroatom containing source compound and a polymerization catalyst to form a mixture, wherein the heteroatom source compound is at least one of a tri-ethyl borate, nitric acid, $NH_3OH$, boric acid, boron acetate, hexamethylenediamine and acrylonitrile,
    b) heating the mixture to polymerize the liquid furfuryl-functional-group compound and forming a polymerized solid;
    c) carbonizing the polymerized solid by heating under a controlled atmosphere, wherein the controlled atmosphere is an inert atmosphere, to form a carbonized solid; and
    d) activating the carbonized solid by heating under a controlled environment to form the heteroatom-doped activated carbon.

2. The method according to claim 1, wherein the liquid furfuryl-functional-group containing compound is at least one of a furfuryl alcohol, furfural, acetylfuran and 5-hydroxymethylfurfural.

3. The method according to claim 1, wherein the polymerization catalyst is at least one of an oxalic acid, maleic acid, benzoic acid, tartaric acid, formic acid, citric acid and acetic acid.

4. The method according to claim 1, wherein the controlled environment is one of a $CO_2$, nitrogen, argon, or steam.

5. The method according to claim 1, wherein the heteroatom source compound is a tri-ethyl borate and the liquid furfuryl-functional-group containing compound is a furfuryl alcohol, wherein polymerization catalyst is at least one of an oxalic acid, maleic acid and tartaric acid.

6. The method of claim 1, further comprising adding an additive to the mixture of the heteroatom source compound, the liquid furfuryl-functional-group compounds and the catalyst, wherein the additive is at least one of a carbon black, graphene, carbon nanotubes and lignin.

7. The method of claim 1, wherein the polymerization step is carried out by heating at a temperature between 25° C. and 200° C.

8. The method of claim 1, wherein the carbonization is performed at a temperature between 600° C. and 800° C.

9. The method of claim 1, wherein the heteroatom containing source is boric acid dissolved in ethanol.

10. The method of claim 1, wherein the heteroatom-doped activated carbon is used for making electrodes for energy storage devices.

11. A method of producing a heteroatom-doped activated carbon, comprising:
   a) mixing a liquid furfuryl-functional-group containing compound with a heteroatom containing source compound to form a mixture, wherein the heteroatom containing source compound is also the polymerization catalyst, wherein the heteroatom containing source compound is boric acid in ethanol;
   b) heating the mixture to polymerize the liquid furfuryl-functional-group compounds and forming a polymerized solid wherein the liquid-furfuryl-functional group compound is at least one of a furfuryl alcohol, furfural, acetylfuran and 5-hydroxymethylfurfural
   c) carbonizing the polymerized solid by heating under a controlled atmosphere, wherein the controlled atmosphere is an inert atmosphere, to form a carbonized solid; and
   d) activating the carbonized solid by heating under a controlled environment to form the heteroatom-doped activated carbon.

12. A method of producing a heteroatom-doped activated carbon, comprising:
   a) mixing a liquid furfuryl-functional-group containing compound with more than one of a heteroatom containing source compound and a polymerization catalyst to form a mixture, wherein the heteroatom-containing source compounds are combinations of at least one of a urea and boric acid, a tri-ethyl borate and urea, an ammonium borate and urea, an tri-ethyl borate and hexamethylenediamine, a boron acetate and urea and a tri-ethyl borate and ammonium hydroxide;
   b) heating the mixture to polymerize the liquid furfuryl-functional-group containing compound and forming a polymerized solid;
   c) carbonizing the polymerized solid by heating under a controlled atmosphere, wherein the controlled atmosphere is an inert atmosphere, to form a carbonized solid; and
   d) activating the carbonized solid by heating under a controlled environment to form the heteroatom-doped activated carbon.

13. The method of claim 12, wherein the heteroatom-containing source compounds are tri-ethyl borate and urea, wherein the polymerization catalyst is at least one of an oxalic acid, tartaric acid, maleic acid, formic acid, benzoic acid and citric acid.

14. The method of claim 12, wherein the heteroatom-containing source compound are the ammonium borate in water solution and the urea in water solution, wherein the polymerization catalyst is at least one of an oxalic acid, tartaric acid, maleic acid, formic acid, benzoic acid and citric acid, and the furfuryl functional group compound is at least one of a furfuryl alcohol, furfural, acetylfuran, and 5-hydroxymethylfurfural.

15. The method of claim 12, wherein the heteroatom-containing source compounds are a solution of the boron acetate in water and the urea in water solution, wherein the polymerization catalyst is at least one of a boric acid, oxalic acid, tartaric acid, maleic acid, formic acid, benzoic acid and citric acid and the furfuryl functional group compound is at least one of a furfuryl alcohol, furfural, acetylfuran, and 5-hydroxymethylfurfural.

16. The method of claim 12, wherein the heteroatom-containing source compounds are an urea in water solution and a boric acid solution in an organic solvent, wherein the polymerization catalyst is at least one of an oxalic acid, tartaric acid, maleic acid, formic acid, benzoic acid and citric acid and wherein the liquid furfuryl-functional-group compound is at least one of a furfuryl alcohol, furfural, acetylfuran, and 5-hydroxymethylfurfural.

17. A method of producing a nitrogen-doped activated carbon, consisting of:
   a) dissolving a powdered urea in a liquid furfuryl-functional-group containing compound and adding thereto a polymerization catalyst to form a mixture, wherein the polymerization catalyst is at least one of a maleic acid, benzoic acid, tartaric acid, formic acid, citric acid, pyridine carboxylic acid and acetic acid; wherein the liquid furfuryl-functional-group containing compound contains furfuryl alcohol;
   b) heating the mixture to polymerize the liquid furfuryl-functional-group compound and forming a polymerized solid;
   c) carbonizing the polymerized solid by heating under a controlled atmosphere, wherein the controlled atmosphere is an inert atmosphere, to form a carbonized solid; and
   d) activating the carbonized solid by heating under a controlled environment to form the heteroatom-doped activated carbon.

* * * * *